United States Patent
Fattal et al.

(10) Patent No.: US 7,751,655 B2
(45) Date of Patent: Jul. 6, 2010

(54) MICRO-RING OPTICAL DETECTOR/MODULATOR

(75) Inventors: David A. Fattal, Mountain View, CA (US); Charles M. Santori, Palo Alto, CA (US); Raymond G. Beausoleil, Redmond, WA (US); Marco Fiorentino, Mountain View, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 5 days.

(21) Appl. No.: 11/881,679

(22) Filed: Jul. 27, 2007

(65) Prior Publication Data

US 2009/0028487 A1    Jan. 29, 2009

(51) Int. Cl.
*G02F 1/035* (2006.01)
*G02B 6/42* (2006.01)

(52) U.S. Cl. .................. 385/2; 385/27; 385/30
(58) Field of Classification Search .............. 385/2, 385/27, 30
See application file for complete search history.

(56) References Cited

U.S. PATENT DOCUMENTS

| | | | |
|---|---|---|---|
| 4,503,447 A | 3/1985 | Iafrate et al. | |
| 5,343,487 A * | 8/1994 | Scott et al. | 372/50.124 |
| 5,493,577 A * | 2/1996 | Choquette et al. | 372/46.013 |
| 5,548,128 A | 8/1996 | Soref et al. | |
| 5,936,266 A * | 8/1999 | Holonyak et al. | 257/106 |
| 6,191,432 B1 | 2/2001 | Sugiyama et al. | |
| 6,331,445 B1 | 12/2001 | Janz et al. | |
| 6,841,795 B2 | 1/2005 | Taylor et al. | |
| 6,879,615 B2 * | 4/2005 | Henrichs | 372/45.01 |
| 7,045,833 B2 * | 5/2006 | Campbell et al. | 257/186 |
| 7,376,169 B2 * | 5/2008 | Henrichs | 372/99 |
| 2002/0167984 A1 | 11/2002 | Scherer | |
| 2003/0047752 A1 * | 3/2003 | Campbell et al. | 257/186 |
| 2003/0160254 A1 * | 8/2003 | Henrichs | 257/88 |
| 2004/0056243 A1 | 3/2004 | Atanackovic et al. | |
| 2004/0126072 A1 * | 7/2004 | Hoon Lee et al. | 385/122 |
| 2005/0110033 A1 * | 5/2005 | Heremans et al. | 257/98 |
| 2005/0141801 A1 | 6/2005 | Gardner | |
| 2006/0198404 A1 * | 9/2006 | Henrichs | 372/29.02 |
| 2008/0205461 A1 * | 8/2008 | Henrichs | 372/29.023 |

FOREIGN PATENT DOCUMENTS

| | | |
|---|---|---|
| WO | WO 00/77861 A1 | 12/2000 |
| WO | WO 2005/062079 A2 | 7/2005 |

* cited by examiner

*Primary Examiner*—K. Cyrus Kianni (57) ABSTRACT

A micro-ring configured to selectively detect or modulate optical energy includes at least one annular optical cavity; at least two electrodes disposed about the optical cavity configured to generate an electrical field in the at least one optical cavity; and an optically active layer optically coupled to the at least one optical cavity. A method of manipulating optical energy within a waveguide includes optically coupling at least one annular optical cavity with the waveguide; and selectively controlling an electrical field in the at least one annular optical cavity to modulate optical energy from the waveguide.

13 Claims, 8 Drawing Sheets

MICRO-RING OPTICAL DETECTOR/MODULATOR

BACKGROUND

Light beams or optical signals are frequently used to transmit digital data between electronic devices, both over long distances and between adjacent circuit boards or even between components on a single circuit board. An optical signal may also be used for other purposes including position or motion sensing, measurement, reading encoded data, etc.

Consequently, optical technology plays a significant role in modern electronics, and many electronic devices employ optical components. Examples of such optical components include, but are not limited to, optical or light sources such as light emitting diodes and lasers, waveguides, fiber optics, lenses and other optics, photo-detectors and other optical sensors, optically-sensitive semiconductors, and others.

Such systems making use of optical components often rely upon the precise manipulation of the optical energy or beam of light to accomplish a desired task. This is especially true in systems utilizing light for high-speed, low-energy communication of data. Such manipulation of an optical signal may include selectively encoding information in a light beam of the optical signal and directing the light beam of the optical signal to a sensor that detects the encoded light beam.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As noted above, light or optical beams can be used for a variety of purposes, including the transmission of data. Applications for such optical data transmission include communication between circuit boards, between electrical components on the same circuit board or between components on a single chip using optical interconnects.

In many cases, interconnections between electrical components are made using metal wires that conduct electrical signals. As electronic components have become more integrated, the wires have become more numerous, narrower, and more closely spaced. This results in a higher resistance in the wires and higher capacitance and inductance between adjacent wires. This increased resistance and capacitance may degrade electrical signals traveling through the wires, reducing the performance of the integrated circuit chips and a computing device as a whole. Further, the bandwidth capability of a wire is directly proportional to the cross-sectional area of the wire. Therefore, as the wire becomes increasingly narrow, the rate at which information can be transmitted through the wire decreases.

One solution to these issues is using optical signals to communicate data between electrical components. In an optical interconnect system, the electrical signal from the integrated circuit (IC) chip or circuit component is converted into an optical signal emitted by a light source, the optical signal being modulate to represent data. The light then travels through free space or through a waveguide to a detector which converts the received optical signal back into an electrical data signal.

Optical interconnections can consume less power than traditional electrical interconnections as the distance traversed increases. Further, optical interconnections are not constrained by capacitance or electrical resistance, dissipate less power than their electrical counterparts, and have the capability to transmit a greater volume of data.

Optical interconnection between a modulator and a detector may be accomplished via free space transmission or through a waveguide. Optical fibers are one example of a waveguide.

Conventional optical interconnection systems generally produce light with an off-chip light source such as a vertical cavity light emitting laser. In such systems, the off-chip light source is normally directly modulated by the circuit on the chip to superimpose information on the optical beam emitted by the light source. Such off-chip light sources are typically packaged separately and aligned with a waveguide. This can create additional expense to separately produce and package the light source, as well as ensure proper alignment with the waveguide.

The present specification discloses systems and methods related to a semiconductor micro-ring suitable for use as both a modulator and a photo-detector. In one embodiment, the micro-ring is configured to be constructed using standard photolithography techniques on a silicon substrate.

The micro-ring consists of an annular optical cavity, an active optical layer, and two electrodes. The active optical layer refers to one or more thin stratums that convert a portion of the photons incident on the thin stratums into an electrical charge. By way of example and not limitation, the active optical layer may comprise a quantum well layer, a quantum dot layer, a bulk semiconductor layer or a combination or series of such layers.

The micro-ring is optically coupled to an adjacent waveguide in such a manner that the optical energy within the waveguide can be selectively directed into the annular optical cavity.

When the micro-ring is being used as a detector, a portion of the optical energy within the annular optical cavity is absorbed by the active optical layer. A subset of the absorbed photons generate electron/hole pairs which are collected by their respective electrodes, creating a voltage or current that can be sensed and is proportional to the number of photons absorbed by the quantum well layer. Thus, in this configuration, the micro-ring acts as a detector by converting the optical energy into an electrical signal.

In one exemplary embodiment, the micro-ring can be selectively coupled to a waveguide such that the optical energy traveling through the waveguide can be modulated. When the micro-ring is being used as a modulator, electrical voltages are applied across the two electrodes, which changes the photon absorption characteristics of the active optical layer. The photon absorption characteristics of the active optical layer directly affect the optical coupling between the micro-ring and the waveguide. As described in the figures below, variations in the coupling between the micro-ring and the waveguide allow the modulation of optical energy as it passes through the waveguide.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. The term "optical source" refers to a device from which optical energy originates. Examples of optical sources as thus defined include, but are not limited to, light emitting diodes, lasers, light bulbs, and lamps.

As used in the present specification and in the appended claims, the terms "optical cavity" or "optical resonator" refer to a structure that sustains optical energy having a certain resonant wavelength or range of wavelengths, and that suppresses or attenuates other optical energy by destructive interference.

As used in the present specification and in the appended claims, the term "optically active" refers to a material that responds to incidence of a photon or optical energy by creating a charge that can be collected by an electrode.

As used in the present specification and in the appended claims, the term "quantum well" refers to a structure consisting of a thin layer of narrower band gap semiconductor sandwiched between thicker layers of a wider band gap material. By way of example and not limitation, a quantum well may be comprised of a thin germanium layer sandwiched between two layers of silicon or a thin layer of gallium arsenide sandwiched between aluminum gallium arsenide. The term "band gap" refers to the difference between a conduction band energy level and the valence band energy level for a given material. Thus, a wide variety of material combinations can be used to construct a quantum well.

Similarly, the term "quantum dot" refers to a semiconductor nanostructure that confines the motion of charge carriers in all three spatial directions. The confinement can be due to electrical fields, the presence of an interface between different semiconductor materials, the presence of a free semiconductor surface, or a combination of the previously listed elements. Throughout this specification, a quantum dot layer can be substituted for a quantum well layer and both exhibit similar optical and electrical behavior. For example, the light absorption by the quantum dot layer is substantially similar to the quantum well layer in the context of the present specification.

As used in the present specification and in the appended claims, the term "dielectric" broadly refers to a material that provides electrical insulation. In the present embodiment, silicon dioxide is used as a dielectric. In alternative embodiments of the invention, the dielectric layer may be composed of different material.

As used in the present specification and in the appended claims, the term "p-type semiconductor" refers to any semiconductor layer to which impurity acceptor materials have been added such that electron holes are majority carriers, while electrons are minority carriers. Similarly, the term "n-type semiconductor" refers to any layer to which impurity electron donor materials have been added such that electrons are the majority carriers, while electron holes are minority carriers.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary micro-rings and exemplary systems and methods of utilizing the exemplary micro-rings. Throughout the specification, specific examples are used to more concisely convey the principles disclosed. For example, the active optical layer is discussed in the context of a germanium quantum well layer or a germanium quantum dot layer. However, the scope of the specification is not limited by the specific examples used to illustrate the principles of the specification. As previously discussed, quantum wells and quantum dots can be constructed using a wide variety of materials, provided that the materials are have different band gaps and appropriate geometries. Further, the active optical layer may be comprised of multiple quantum well layers or of a combination of quantum well layers that utilize different materials.

Figure 1:
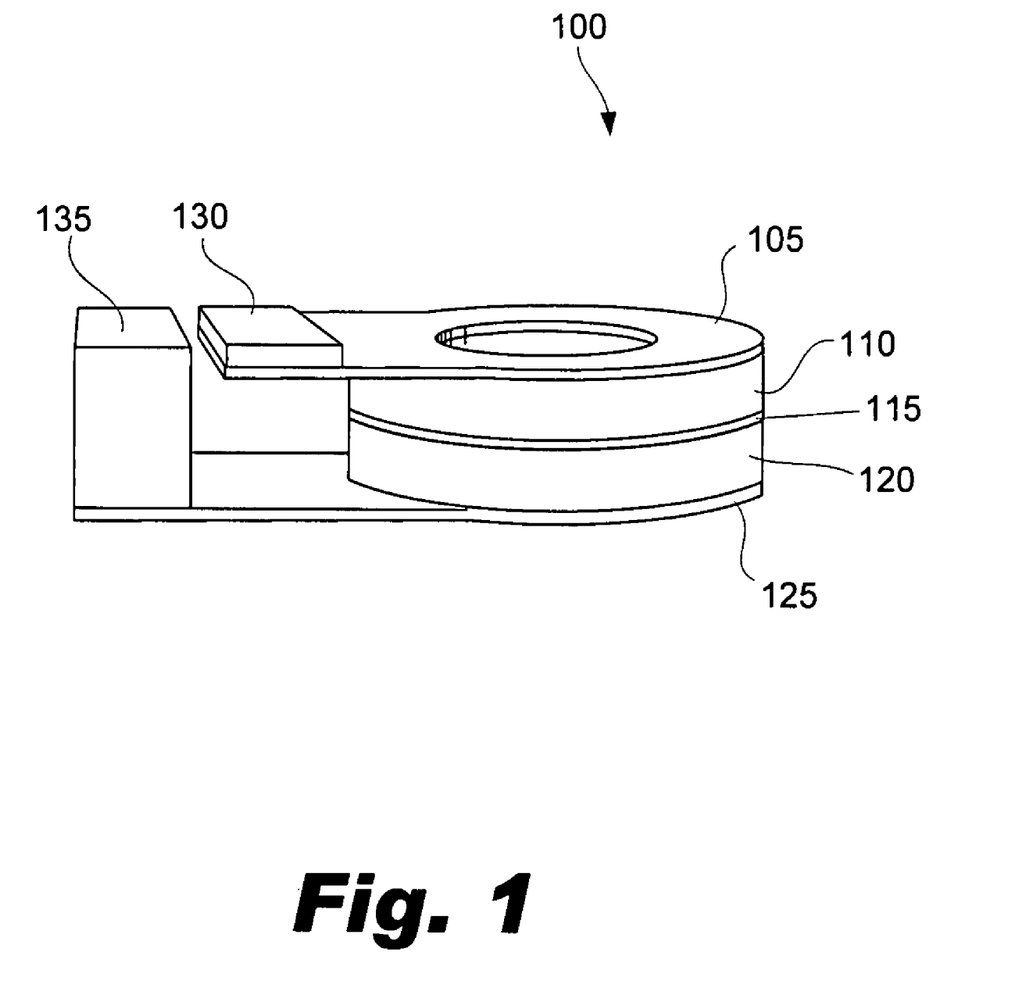
FIG. 1 is a perspective view of an exemplary embodiment of a germanium quantum well micro-ring, according to principles described herein.
Figure 6:
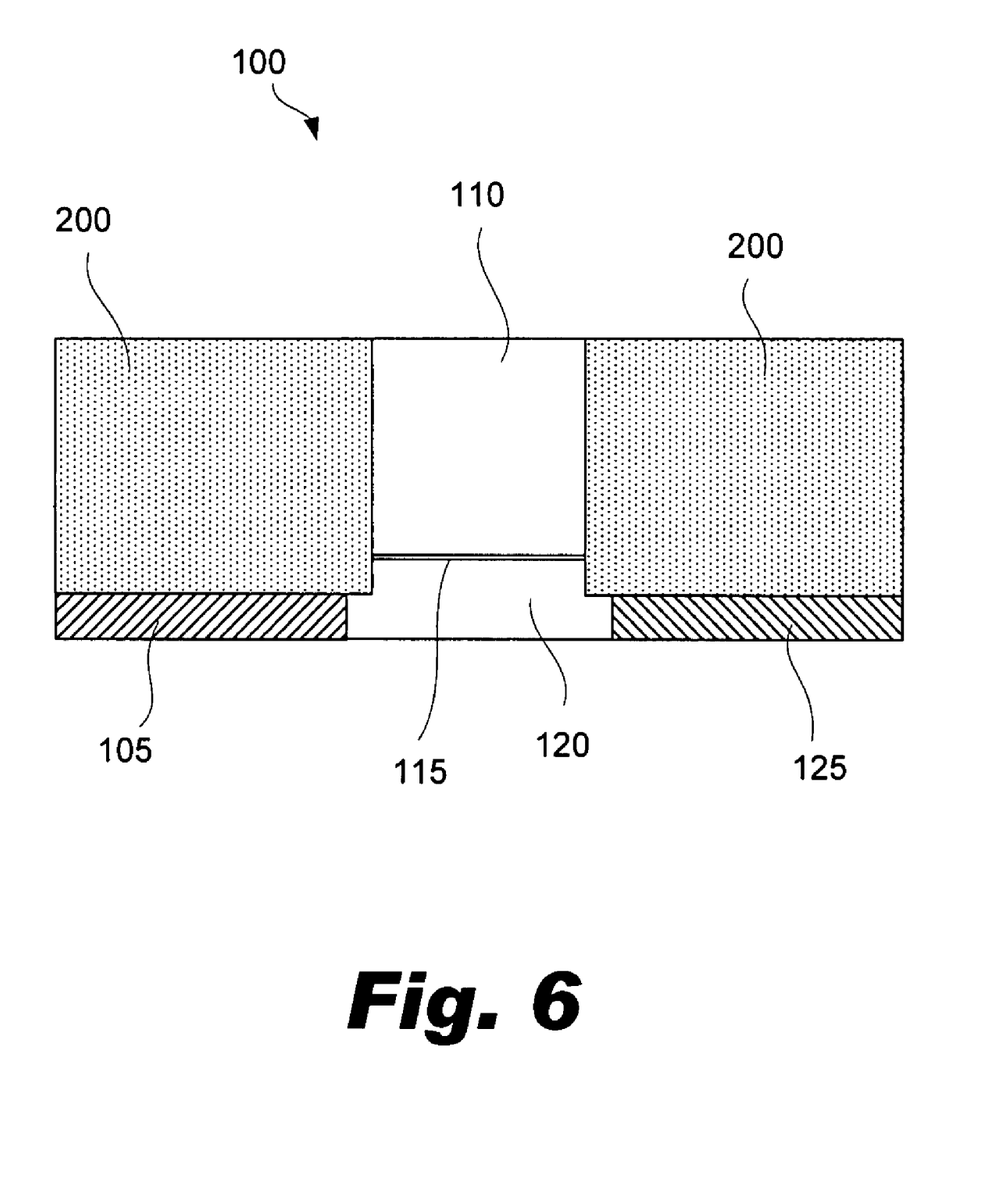
FIG. 6 is a cross-sectional diagram of an exemplary embodiment of a germanium quantum well micro-ring, according to principles described herein.

FIG. 1 shows a perspective view of an exemplary embodiment of a quantum well micro-ring (100) that can be used as an optical modulator or detector. The exemplary micro-ring is constructed with a bottom electrode (125) which is comprised of a layer of n-doped silicon. On top of the n-silicon electrode (125), a first layer of silicon in the form of a ring is deposited. This layer of silicon forms a first annular optical (120) cavity into which optical energy may be channeled. As shown in FIG. 6, under appropriate conditions described herein, the ring of silicon (120) is transmissive of optical energy and, like a waveguide, circulates optical energy around the ring within the silicon material. Thus, the ring forms an optical cavity (120) with an annular shape. As will be shown in other figures, the center of the ring (120) may be filled with a dielectric.

Above the first layer of silicon (120), an optically active layer (115) is substantially uniformly deposited. For example, the optically active layer (115) may be a thin germanium layer. On top of the optically active layer (115), a second silicon layer creates a second annular optical cavity (110) that is also part of the micro-ring. Above the second silicon layer (110) a p-doped layer of silicon is deposited, creating a top electrode (105). The top electrode (105) and the bottom electrode (125) are respectively connected to electrical contacts (130, 135).

It is understood that the specification is not limited to the specific geometry or materials of a particular embodiment. As indicated above, the quantum well could be formed of materials other than a thin layer of germanium sandwiched between silicon. Additionally, the electrodes could be formed with alternate doping and geometries. Various other possible configurations for a micro-ring will be illustrated and described below.

The annular optical cavities (110, 120) are transparent to particular wavelengths of light that are to be detected or modulated by the micro-ring (100). Typically, the optical cavities (110, 120) are surrounded by material with a different index of refraction, such as air or another solid. Thus configured, the annular optical cavities (110, 120) serve as optical resonators that sustain optical energy having a certain resonant wavelength or range of wavelengths, and suppress or attenuate other optical energy by destructive interference. The physical geometry of an optical cavity (110, 120) can be altered to resonant at specific wavelengths of light by changing the optical cavity's diameter, material, optical index, etc.

Where the optically active layer (115) is formed of germanium, a quantum well results. The depth of the germanium layer (115) is on the order of nanometers and is substantially uniform in thickness. Further, the germanium layer (115) has a lower band gap than the two silicon rings (110, 120) between which it is sandwiched. This combination of geometry and difference in material properties creates a quantum well. Additionally, the rotation invariant geometry of the optically active layer minimizes both coherent backscattering and incoherent free space scattering within the optical cavities (110, 120).

As noted above, the specification is not limited to a germanium quantum well geometry. As previously discussed, other materials and geometries that form an optically active layer could be used. For example, a quantum dot layer could form an optically active layer with the same rotation invariant geometry and similar optical and electrical properties.

The top and the bottom electrodes (105, 125) are formed by doping silicon with appropriate materials to create a high density of free charge carriers within the doped silicon region. Although one electrode is designated as being n-doped and the other is designated as being p-doped, the p-doped and n-doped layers can be interchanged without affecting the properties of the micro-ring.

The electrodes are electrically connected to respective contacts (130, 135). The contacts (130, 135) can be made out of a variety of materials, including an aluminum alloy. To make better ohmic contact between the doped silicon electrodes (105, 125) and the electrical contacts (130, 135) a thin layer of highly doped silicon (not shown) can be formed between the silicon electrode (105, 125) and the contact (130, 135, respectively).

The configuration of the contacts and electrodes shown in the figures was chosen for clarity of illustration. The metal contacts may have various alternative geometries and attachment locations to fulfill the design requirements of a specific application.

In one exemplary embodiment, the micro-ring diameter is between five and ten microns in diameter and about 200 nanometers in vertical height. This small geometric size leads to low capacitance of the exemplary micro-ring and correspondingly high speed capability to detect or modulate optical energy.

In FIG. 1 the germanium quantum well micro-ring is shown as a freestanding structure for clarity of illustration. However, in other embodiments, the micro-ring may be constructed using photolithography techniques on a silicon substrate and, as shown for example in FIG. 2, surrounded by silicon dioxide or other structural material. Silicon dioxide serves as a dielectric which electrically insulates the micro-ring elements. Additionally, a variety of compositions may be used as the dielectric such as $SiO_x$—where x ranges from some non-stoichiometric number to 2.

In the illustrated example, the difference in the index of refraction of silicon dioxide and the optical cavities (110, 120) of the silicon rings optically isolates the optical cavities (110, 120). Further, the silicon dioxide serves as a mechanical support for the micro-ring (100), making a more robust device.

Figure 2:
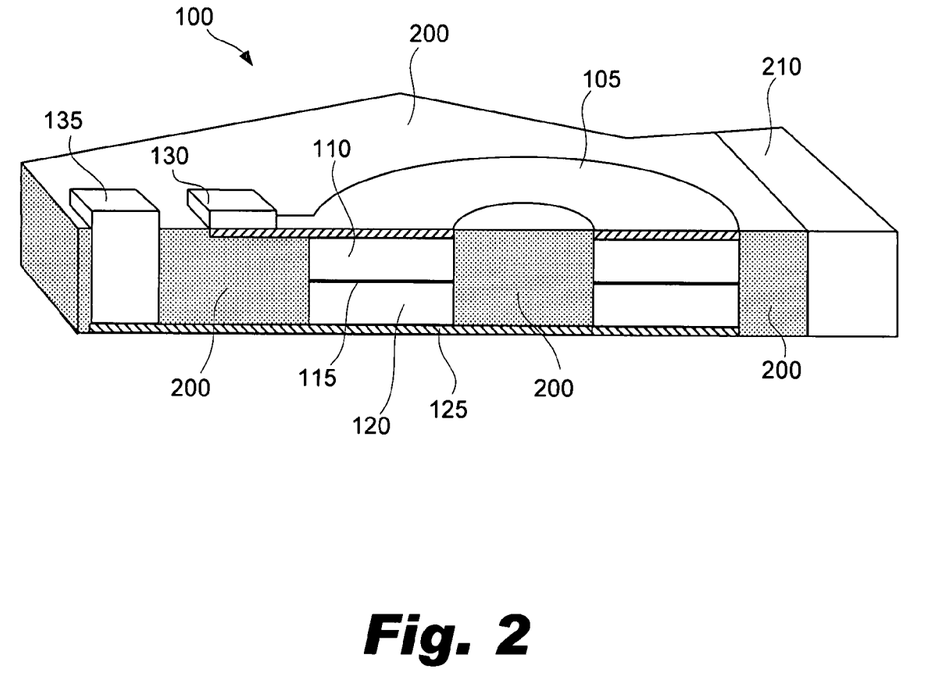
FIG. 2 is a cross-sectional diagram of an exemplary embodiment of a germanium quantum well micro-ring and an adjacent waveguide, according to principles described herein.

FIG. 2 shows a cross-sectional diagram of an exemplary embodiment of a micro-ring (100) formed using lithographic techniques on a silicon substrate and showing silicon oxide regions (200) that surround the components of the micro-ring. Also shown is an exemplary waveguide (210) which lies to one side of and is optically coupled with the micro-ring (100).

In one embodiment, an off-chip light source (not shown), such as a diode laser or light emitting diode, directs optical energy into the waveguide (210). In another embodiment, the light source that directs optical energy into the waveguide (210) is integrated into the same IC chip as the micro-ring.

The optical energy within the waveguide can be comprised of a single frequency or a combination of optical frequencies within which the waveguide is optically transparent. For example, a silicon waveguide is capable of transmitting light with wavelengths from about 400 nm to 2 microns. A waveguide may be selected from a wide variety of optically transparent materials according as best suits a particular application.

Figure 3:
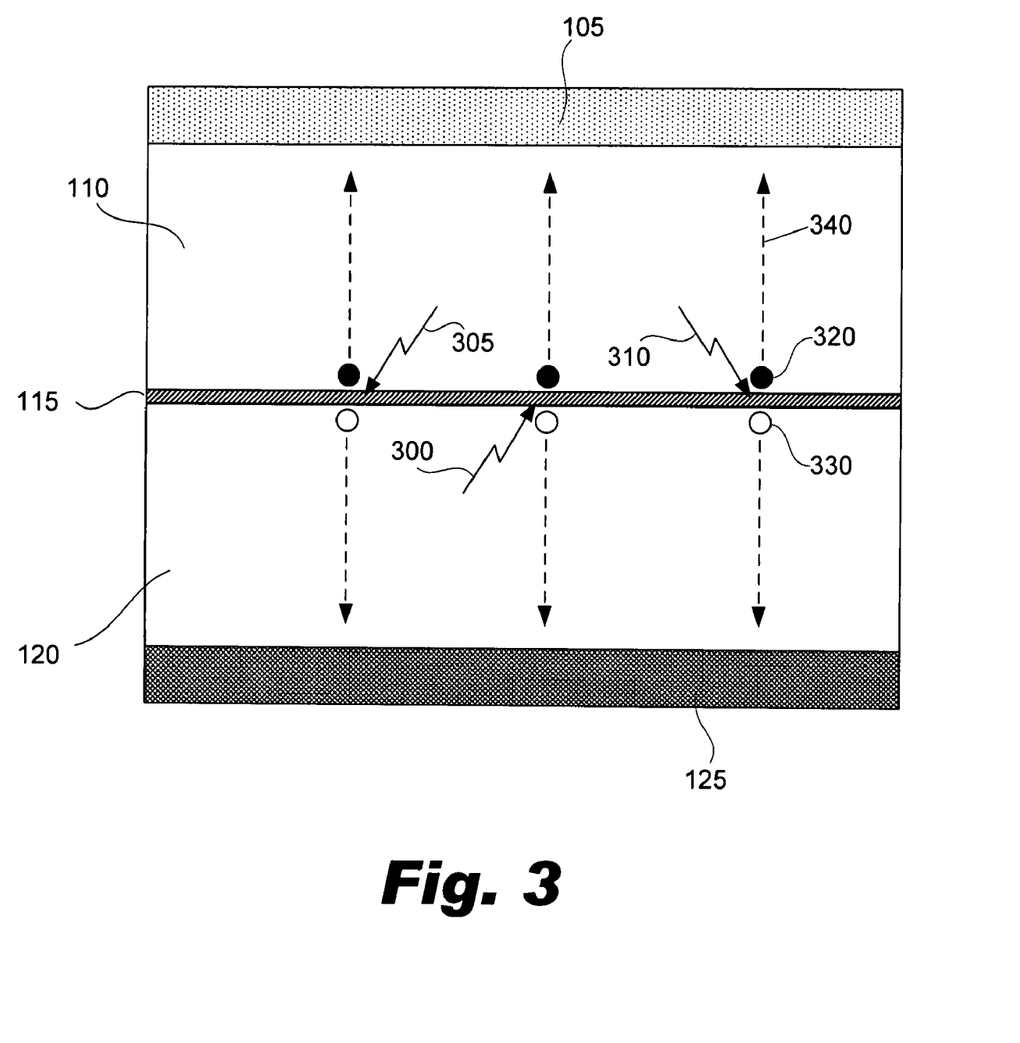
FIG. 3 is a diagram showing photo excitation of the germanium quantum well layer, according to the principles described herein.

As mentioned above, the micro-ring (100) may be used both as a photo-detector and optical modulator. In FIG. 3, a micro-ring is shown being used as a detector. When used as a detector, light from the waveguide (210, FIG. 2) is received in the optical cavities (110, 120). If the wavelength of the light matches that to which the optical cavities (110, 120) are tuned, the optical signal is converted into electricity, creating a current or voltage that is proportional to the amount of light within the micro-ring.

The light energy enters the optical cavities (110, 120) from the waveguide and circulates around the interior of the optical cavities (110, 120). Light of the right wavelength or wavelengths resonates in the optical cavities (110, 120). Light of a wavelength to which a cavity is not tuned destructively interferes with itself and is extinguished.

A portion of the photons of light that is resonating within the optical cavities (110, 120) is incident on the germanium quantum well layer (115). Photons (300, 305, 310) can impact the germanium quantum well layer in a variety of locations and at various angles of incidence, as shown FIG. 3. A portion of the incident photons create electron/hole pairs (320, 330) by light excitation. The electrons and holes escape the germanium quantum well layer and propagate through the silicon layers (110, 120) to be collected by their respective electrodes (105, 125).

In the presence of an electrical field that permeates the optical cavities and quantum well layer, the path (340) that any electron or hole travels to its respective electrode is substantially equal to the path of any other electron or hole generated within the germanium quantum well layer, regardless of where the originating photon (300, 305, 310) was incident on the quantum well layer. Further, because the quantum well layer is very thin, there is no substantial difference between the path of an electron that is generated by a photon incident on the upper surface of the quantum well (305, 310) and the path of an electron that is generated by a photon incident on the lower surface of the quantum well (300).

Because the electrons generated in the quantum well travel substantially the same distance, they arrive at the electrodes (105, 125) at substantially the same time. This avoids the issue frequently confronted by high speed electrical devices in which electrons are generated in a bulk material and travel varying distances to reach the collecting electrode. In such devices, the electrons that must travel the farthest arrive last, creating a "tail" in the signal. This distorts the electrical signal and limits the speed of the electrical device.

Returning to FIG. 2, as indicated above, the waveguide (210) is optically coupled with the micro-ring (100) such that optical energy in the waveguide (210) enters the micro-ring (100) where the optical energy may be detected or modulated. This coupling plays an important role in the operation of the system. As indicated, the micro-ring optical cavities (110, 120) preferentially couple light frequencies contained in the waveguide (210) that match the resonant frequencies of the optical cavities (110, 120).

The rate at which the micro-ring optical cavities (110, 120) can accept optical energy from the waveguide (210) is directly proportional to the amount of light that is internally dissipated by the micro-ring. "Critical coupling" occurs when the rate of energy transfer between the waveguide and the ring equals the rate of energy dissipation in the ring itself (either by absorption or by scattering).

Practically, critical coupling is achieved by controlling the size of the gap between the edge of the waveguide (210) and the perimeter of the micro-ring (110, 120). Note that the presence of a gap per se is not a requirement for critical coupling; any geometry of the junction between the ring and the waveguide providing the equivalent coupling rate for energy transfer might be used. Failure to achieve proper critical coupling will result in the degradation of the modulation ratio in the case of a modulator and of optical efficiency in the case of the detector.

As mentioned above, a waveguide and micro-ring are critically coupled when the following equation is satisfied: $1/Q_{coup}=1/Q_{abs}+1/Q_{scat}$, where $Q_{coup}$ represents the energy transfer rate from the waveguide to the micro-ring, $Q_{abs}$ represents the energy dissipation due to absorption within the micro-ring, and $Q_{scat}$ represents the energy that escapes the micro-ring due to scattering.

As shown by the equation above, when the micro-ring is critically coupled to the waveguide, the degree of coupling, or the energy transfer rate, between the waveguide and the micro-ring is directly related to the optical energy dissipation within the micro-ring. The micro-ring can receive light from the waveguide no faster than light is dissipated within the micro-ring. The optical energy dissipation rate within the micro-ring may be controlled by two factors: the absorption of light within the micro-ring, which is represented by the term $Q_{abs}$ in the equation above, and the light that escapes the micro-ring due to scattering, which is represented by the term $Q_{scat}$.

Although there are many mechanisms that can lead to absorption and scattering of the light within the micro-ring, the micro-ring becomes more efficient in both detecting and modulating light when the quantum well is the primary means of absorption, and losses due to scattering are minimized. For example, scattering can be minimized by reducing the surface roughness of the optical elements and eliminating impurities within the material that makes up the optical cavities.

The sum of the light energy that is absorbed within the optical cavities ($Q_{abs}$) and the light that is lost from the optical cavities ($Q_{scat}$) equals the optical energy dissipation of the micro-ring. Because the optical cavity dissipates optical energy, it is called a "lossy" resonator. When a waveguide is critically coupled to a lossy resonator, the energy transfer rate from the waveguide to the lossy resonator is equal to the energy loss within the resonator. If the lossy resonator dissipates optical energy at a rate equal to the amount of optical energy incident in the waveguide at the optical cavity's resonant frequency, then all the optical energy of that frequency in the waveguide will be transferred to and dissipated in the resonator.

Modulation of light energy conveyed through the waveguide is accomplished by means of this optical coupling effect. The term "modulation" refers to encoding information in the light transmitted through the waveguide by converting electrical signals into optical variations in the transmitted light.

To modulate the light contained within a waveguide, an electrical signal that represents the information to be encoded into the light is generated and conveyed to the micro-ring as a voltage difference across the top and bottom electrodes (105, 125). This voltage difference creates an electrical field that permeates the quantum well layer (115). As described below, the electrical field alters the light absorption characteristics of the quantum well layer, which changes total dissipation of optical energy within the micro-ring.

The "off" state of the modulator is realized by tuning the absorption of the quantum well to a value that insures critical coupling. In that state, all the incident light from the waveguide is absorbed in the ring, and no signal is transmitted. The "on" state is realized by tuning the absorption of the quantum well away from the critical coupling value. This can be done by increasing or decreasing the absorption of the quantum well. Thus, the quantum well micro-ring converts a voltage across the electrodes into a modulation of the amplitude of light within the waveguide.

Figure 4:
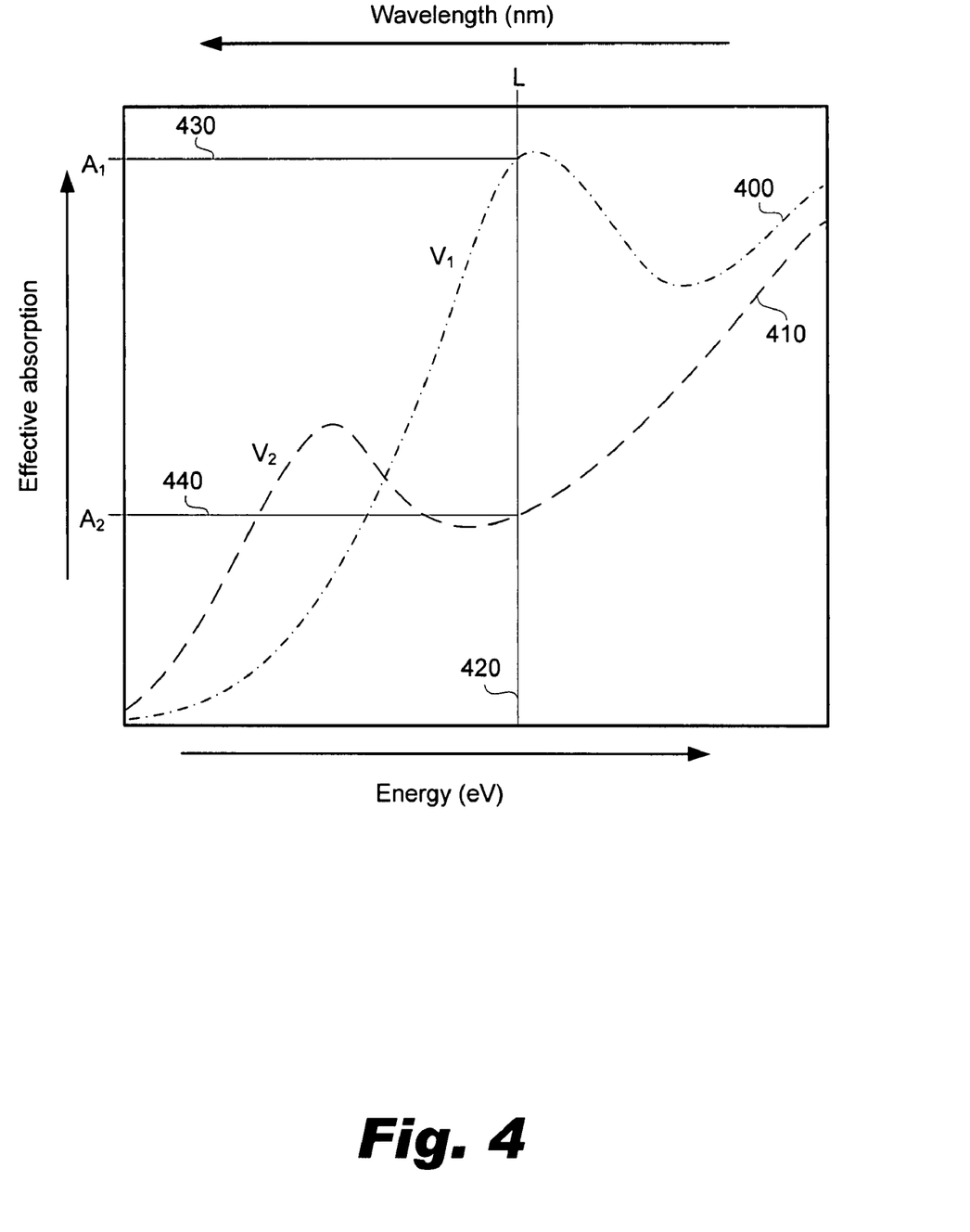
FIG. 4 is a diagram showing an idealized relationship between applied electrical voltage and light absorption characteristics of the germanium quantum well layer, according to principles described herein.

FIG. 4 shows a diagram that describes the effect of changing the voltage across the electrodes (105, 125, FIG. 1) on the effective photon absorption of the germanium quantum well layer (115, FIG. 1). The diagram is an idealized representation and is only intended to conceptually illustrate the principles discussed herein.

The vertical axis of the diagram in FIG. 4 represents the range of effective photon absorption by the germanium quantum well layer. Lower absorption rates are represented being closer to the abscissa with higher absorption rates being correspondingly more distant from the abscissa. The horizontal axis of FIG. 4 represents a range of photon energy levels as measured in electron volts, with lower energy levels being closest to the ordinate axis and higher energies being correspondingly more distant from the ordinate axis. The wavelength of light, as shown on the upper edge of the graph, is inversely proportional to the energy level of the photons. Thus, longer wavelengths of light have lower photon energies.

The graph contains two profiles, which represent the effective photon absorption of the germanium quantum well layer when it is permeated by two different electrical fields. The first profile (400) represents the effective absorption of the quantum well when a voltage V1 is applied across the micro-ring electrodes (105, 125; FIG. 1). Similarly the second profile (410) represents the effective absorption of the quantum well when a voltage V2 is applied across the electrodes. Light of wavelength L is designated by a vertical line (420). A first horizontal line (430) corresponds to an effective absorption within the quantum well of A1 for light of wavelength L when voltage V1 is applied across the micro-ring electrodes. Similarly, a second horizontal line (440) corresponds to an effective absorption of A2 for light of wavelength L when voltage V2 is applied across the micro-ring electrodes.

As shown in the graph, the effective absorption of the germanium quantum well layer is dependent both on applied voltage and the energy level of the incident light. By changing the applied voltage, the electrical field is changed in the germanium quantum well layer to alter its light absorption characteristics. For example, at an applied voltage of V1, light of wavelength L is strongly absorbed by the quantum well layer. At an applied voltage of V2, the quantum well absorbs much less light of wavelength L.

The alteration of the light absorption in a quantum well layer as a result of an applied electrical field occurs because of the electrical field's effect on the energy bands of the quantum well. In the absence of an electrical field, the electrons are localized within the region of the quantum well and there is an overlap between electrons (or, more precisely, electron wave functions) and holes (or, more precisely, hole wave functions). If an electrical field is applied to the quantum well layer, however, valence band and conduction band "tilt" in response to the applied field. As the valence band and conduction band "tilt," a fraction of the electrons move outside of the quantum well layer. As the electrons (or electron wave functions) move outside of the germanium quantum well layer, there are fewer re-combinations of holes with the electrons.

The ability of the quantum well layer to absorb light is (approximately) proportional to the magnitude of re-combinations between the holes and the electrons occurring in a layer. In other words, the absorption coefficient of the germanium quantum well layer decreases as a fraction of the electrons moving outside the layer. This is called the Quantum Confined Stark Effect (QCSE). Thus, by varying the voltage across the micro-ring electrodes (105, 125; FIG. 1) the light absorption characteristics of the quantum well layer are altered and an optical signal can be modulated.

Other modulation mechanisms exist that could be utilized to alter the photon absorption within the optically active layer. By way of example and not limitation, for an optically active layer comprised of a bulk semiconductor material, the optical absorption of the optically active layer can be altered in response to a high voltage energy field. This is called the Franz-Keldysh effect.

Figure 5A:
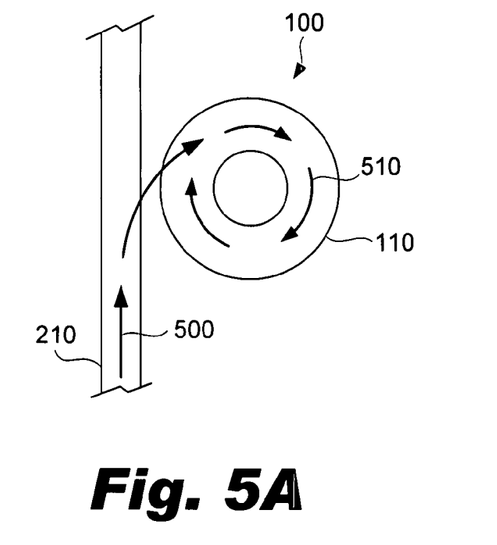
FIGS. 5A-5C are diagrams of light coupling between a waveguide and an exemplary embodiment of a quantum well micro-ring, according to principles described herein.
Figure 5B:
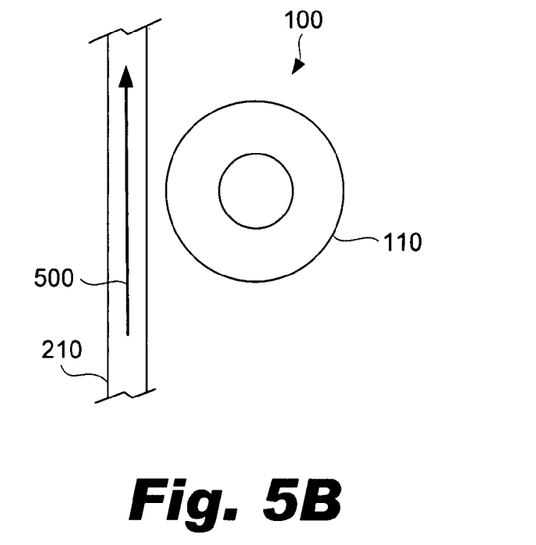
Figure 5C:
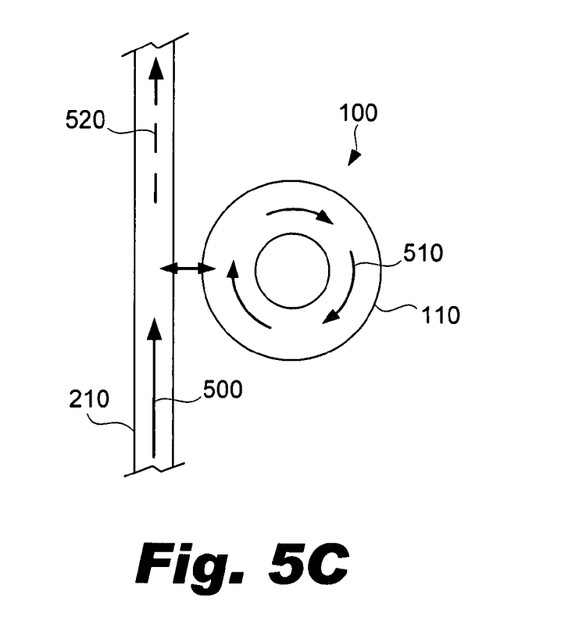

FIGS. 5A-5C illustrate the modulation of light energy carried by a waveguide by altering the light absorption characteristics of the quantum well layer. FIG. 5A represents an idealized situation where a critically coupled micro-ring (100) transfers and dissipates all of light flux of wavelength L (500) contained within a waveguide (210). Thus, the "off" state in the modulation is achieved by accepting substantially all of the light (500) in the waveguide (210) into the optical cavity and then dissipating the light (510) in the optical cavity (110). As discussed above, this situation corresponds to strong absorption by the quantum well layer of the light of wavelength L and results in the all incident light from the waveguide being absorbed by the micro-ring. In the context of FIG. 4, where the monochromatic light flux (500) is of wavelength L, the quantum well layer would have a high effective absorption when voltage V1 is applied across the micro-ring electrodes (105, 125; FIG. 2).

FIG. 5B represents an idealized situation where a critically coupled micro-ring (100) does not interfere with the passage of light (500) through the waveguide (210), or the "on" state in modulation. As discussed above, this situation corresponds to weak absorption by the quantum well layer of the frequency of light contained in the waveguide. In the context of FIG. 4, where the light (500) is of wavelength L, the quantum well layer would have a low effective absorption when voltage V2 is applied across the micro-ring electrodes (105, 125; FIG. 2). In practice, complete decoupling of the micro-ring is difficult to achieve because of the parasitic dissipation of light energy within the micro-ring as a result of absorption and scattering. It is understood that FIG. 4 only presents one example of varying the level of absorption and critical coupling by changing the voltage across the electrodes.

FIG. 5C illustrates the analog modulation of light flux of wavelength L (500) by the micro-ring (100) in response to variations in the applied voltage across the micro-ring electrodes (105, 125; FIG. 2). Similar to FIGS. 5A and 5B, the micro-ring is critically coupled to the waveguide (210). By varying the voltage across the micro-ring electrodes, the effective absorptivity of the micro-ring at wavelength L changes according to the Quantum Confined Stark Effect. Because light (510) is only coupled into the micro-ring proportionately to the absorptivity of the micro-ring, changing the absorptivity by altering the voltage across the electrodes results in the modulation of light within the wave guide (210). The modulated light (520) carries the information in the form of a modulated light beam that passes through the wave guide to the receiving electronic component, where a photo-detector will convert the modulated light beam back into electrical signals.

In addition to the configuration shown in FIG. 1, the micro-ring, quantum well and electrodes described herein can be arranged in a variety of different configurations.

For example, in FIG. 6, a cross-sectional diagram of another embodiment of the micro-ring annulus is illustrated. In this exemplary embodiment, the micro-ring (100) comprises upper and lower annular optical cavities (110, 120). A thin layer of germanium (115) is sandwiched between the optical cavities (110, 120) to form a quantum well (115).

A p-doped silicon layer forming a first electrode (105) and an n-doped silicon layer forming a second electrode (125) are disposed on either side of the lower optical cavity (120) around the quantum well (115). Silicon oxide dielectric (200) surrounds the optical cavity (110, 120) and quantum well layer (115). In this configuration, an electrical field is generated by a voltage difference across the first electrode (105) and the second electrode (125).

Figure 7:
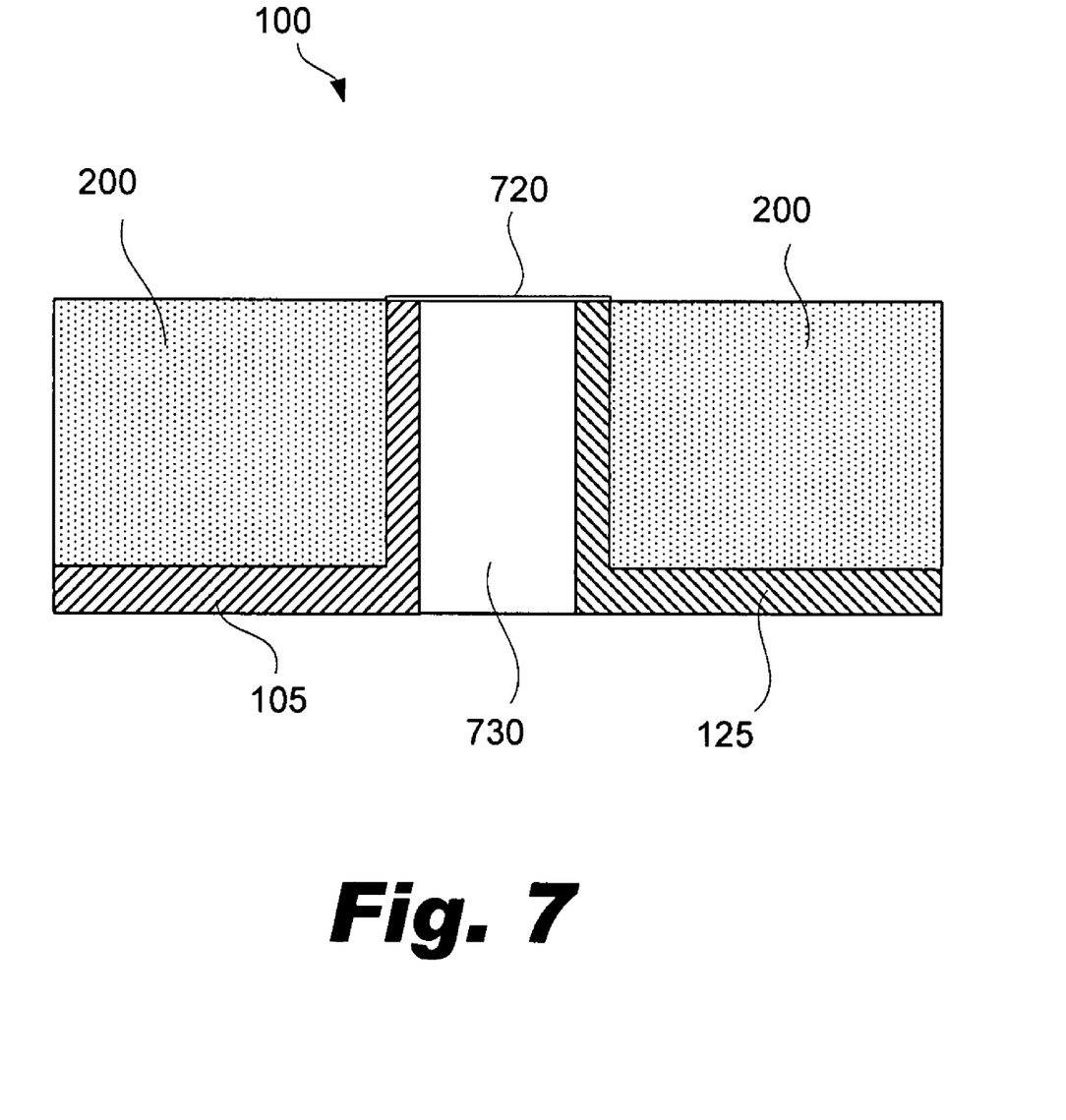
FIG. 7 is a cross-sectional diagram of an exemplary embodiment of a germanium quantum well micro-ring, according to principles described herein.

FIG. 7 shows still another cross-sectional diagram of an exemplary embodiment of the micro-ring (100). In this exemplary embodiment, the micro-ring (100) includes a single annular optical cavity (730).

A p-doped silicon layer forming a first electrode (105) and an n-doped silicon layer forming a second electrode (125) are disposed around the optical cavity (730). In this embodiment, the first electrode (105) is interposed between a silicon oxide dielectric layer (200) and the optical cavity (730) such that it covers at least a fraction of the outer periphery of the optical cavity. The second electrode (125) is formed on the opposite side of the optical cavity (730) and is similarly interposed between the silicon oxide dielectric layer (200) and optical cavity (700) such that it covers at least a fraction of the inner periphery of the optical cavity (700).

The germanium quantum well layer (720) is deposited on the top of the optical cavity (730). One manufacturing advantage to this embodiment is that the difficulty of epitaxially growing silicon on top of the germanium layer is avoided.

Figure 8:
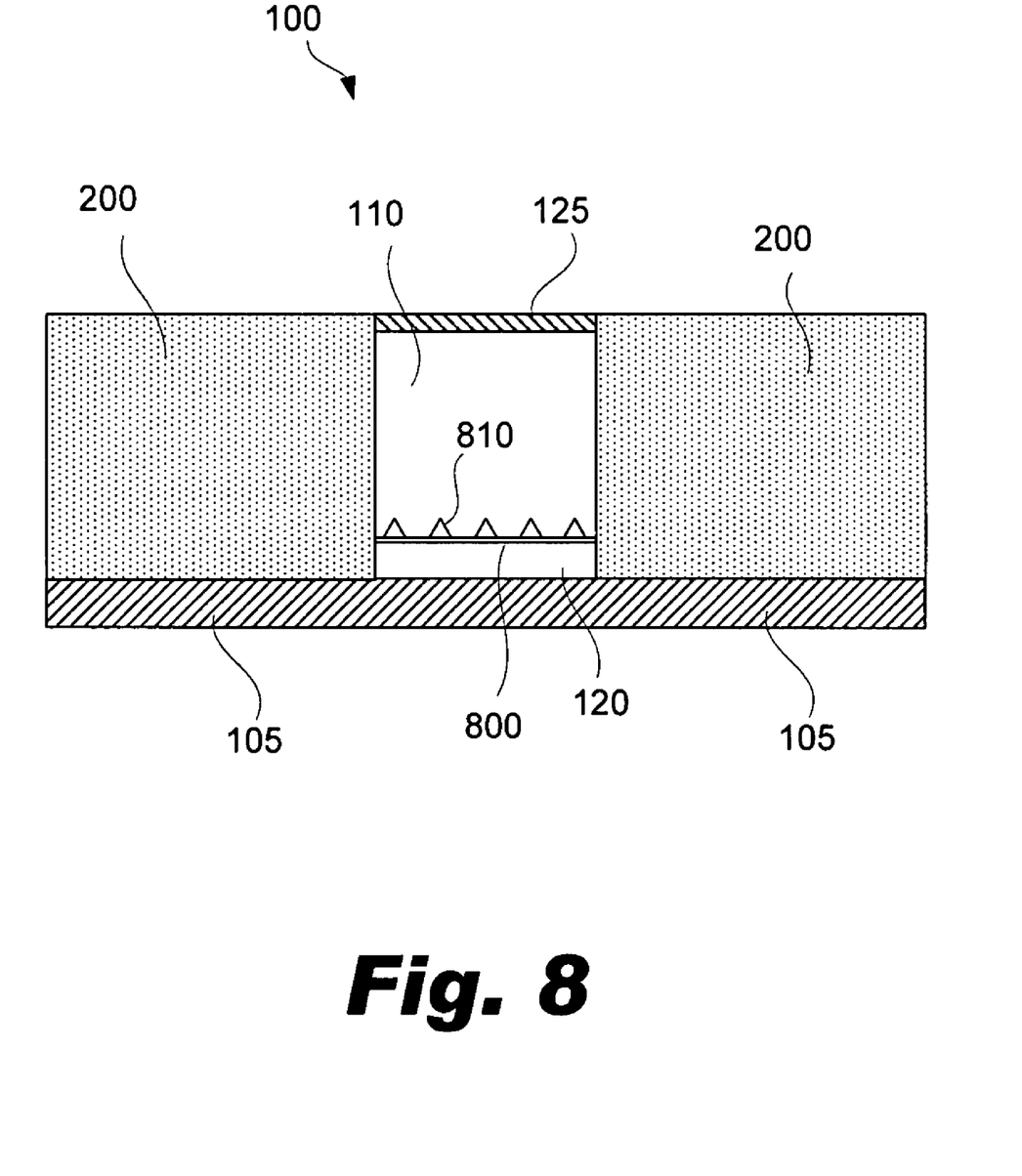
FIG. 8 is a cross-sectional diagram of an exemplary embodiment of a germanium quantum dot micro-ring, according to principles described herein.

FIG. 8 shows an alternative embodiment of the micro-ring (100). In this exemplary embodiment, the micro-ring (100) again comprises two silicon rings forming optical cavities (110, 120). The embodiment further comprises a p-doped silicon layer forming a first electrode (105) that extends over the bottom of the micro-ring or lower optical cavity (120). An n-doped silicon layer forming a second electrode (125) is formed above the upper optical cavity (110).

A thin layer of germanium is sandwiched between the two rings or intrinsic silicon layers (110, 120), forming a thin germanium quantum structure (800). In this embodiment, the germanium layer forms three-dimensional "quantum dots" (810), instead of remaining as a two-dimensional quantum well A thin wetting layer (800) of possibly intermediate concentration may extend between the quantum dots along the interface between the optical cavities (110, 120). Silicon oxide dielectric (200) surrounds the optical cavities (110, 120) and quantum well layer (810, 800).

In this embodiment germanium quantum dots (810) and the wetting layer are grown on the upper surface of the lower silicon optical cavity (120). Quantum dots form spontaneously during the deposition process when the germanium layer reaches a critical thickness of about four or more monolayers. A silicon layer (110) can be grown on the upper surface of the germanium quantum dot layer (810). In one embodiment, the germanium quantum dots (810) are fully strained through their entire height to facilitate the growth of the silicon layer above the quantum dot layer.

As discussed previously, the quantum dot configuration is interchangeable with the quantum well layer in many embodiments of the present invention. Thus, the quantum dot layer could be utilized to form the active optical layer in any of the previous embodiments.

As illustrated in the previous figures, there are a wide range of electrode geometries that can be effectively used in the micro-ring. By way of example and not limitation, the geometry of the electrodes can be altered to accommodate manufacturing considerations, to alter the electrical field characteristics, and to more efficiently collect the charges generated within the quantum well layer. Similarly, quantum well layer geometry and composition can be adapted to specific applications.

The micro-ring has several advantages including wavelength selectivity, high speed operation, and efficient manipulation of light. First, the micro-ring is wavelength selective. Because the micro-ring selectively interacts with light of specific wavelengths, it is less susceptible to interference from other optical frequencies and has lower noise characteristics. The wavelength selectivity of the micro-ring is desirable so that if more than one wavelength of light is traveling through the waveguide, each wavelength can be independently modulated without influencing the other wavelengths.

The micro-ring is wavelength selective in at least two ways: resonant selectivity (the optical cavity sustains optical energy having a certain resonant wavelength or range of wavelengths, and suppresses or attenuates other optical energy by destructive interference) and quantum well selectivity (the quantum well is selectively more sensitive to light at particular wavelengths).

The small physical size of the micro-ring leads to small electrode and conductor areas, which results in low electrical capacitance. In many devices the electrical capacitance limits the operational speed of the device. Because of the micro-ring's low capacitance and other characteristics, it is anticipated that micro-ring can operate at terahertz speeds.

The micro-ring efficiently detects and modulates light. The optical cavity confines the light that is coupled into the device until it can be absorbed by the quantum well. Further, the micro-ring has comparatively low power consumption as a result of effectively utilizing the QCSE to modulate light.

The preceding description has been presented only to illustrate and describe embodiments and examples of the principles described. This description is not intended to be exhaustive or to limit these principles to any precise form disclosed. Many modifications and variations are possible in light of the above teachings.

What is claimed is:

1. A micro-ring configured to selectively detect or modulate optical energy comprising:
    at least one annular optical cavity;
    at least two electrodes disposed about said optical cavity configured to generate an electrical field in said at least one optical cavity; and
    an optically active layer optically coupled to said at least one optical cavity;
    in which said micro-ring is critically coupled to a tangential waveguide such that:
    $1/Q_{coup}=1/Q_{abs}+1/Q_{scat}$; where $Q_{coup}$ is an energy transfer rate from said tangential waveguide to said micro-ring, $Q_{abs}$ is energy dissipation due to absorption within said micro-ring, and $Q_{scat}$ is energy that escapes said micro-ring due to scattering.

2. The micro-ring of claim 1, wherein said optically active layer comprises germanium.

3. The micro-ring of claim 1, wherein said optically active layer and said at least two electrodes are configured such that substantially all charges generated by photo excitation within said optically active layer travel substantially a same distance between said optically active layer and one of said at least two electrodes.

4. The micro-ring of claim 1, wherein said optically active layer further comprises a quantum well.

5. The micro-ring of claim 1, wherein said optically active layer further comprises a plurality of quantum dots.

6. The micro-ring of claim 1, wherein said electrodes are disposed above and below said annular optical cavity.

7. The micro-ring of claim 1, wherein said electrodes are disposed laterally around said annular optical cavity.

8. The micro-ring of claim 1, wherein said optically active layer is sandwiched between two annular optical cavities.

9. The micro-ring of claim 1, further comprising a waveguide optically coupled with said at least one optical cavity.

10. The micro-ring of claim 9, further comprising an optically transmissive dielectric disposed between said waveguide and said at least one optical cavity.

11. The micro-ring of claim 10, wherein said dielectric comprises silicon dioxide.

12. The micro-ring of claim 1, further comprising photons coupled from said tangential waveguide, said photons being incident on said optically active layer, thereby generating positive electrical charges and negative electrical charges; in which said micro-ring is configured such that said positive electrical charges and said negative electrical charges travel a substantially equal distance to an oppositely charged electrode.

13. A micro-ring configured to selectively detect or modulate optical energy comprising:
    at least one annular optical cavity;
    at least two electrodes disposed about said optical cavity configured to generate an electrical field in said at least one optical cavity; and
    an optically active layer optically coupled to said at least one optical cavity; wherein said optically active layer is sandwiched between two annular optical cavities;
    wherein said optically active layer is sandwiched between two annular optical cavities;
    in which an upper electrode and a lower electrode sandwich said optically active layer and two annular optical cavities between them such that photo-electrically produced electrons and holes generated in said optically active layer travel a substantially equal distance to be collected by said upper and lower electrodes.

* * * * *